US012560847B2

(12) United States Patent
Masten, Jr.

(10) Patent No.: US 12,560,847 B2
(45) Date of Patent: Feb. 24, 2026

(54) SMART GLASS WITH NEAR-FIELD WIRELESS CONNECTIVITY

(71) Applicant: James William Masten, Jr., Everett, WA (US)

(72) Inventor: James William Masten, Jr., Everett, WA (US)

( * ) Notice: Subject to any disclaimer, the term of this patent is extended or adjusted under 35 U.S.C. 154(b) by 576 days.

(21) Appl. No.: 18/056,234

(22) Filed: Nov. 16, 2022

(65) Prior Publication Data

US 2023/0152653 A1 May 18, 2023

Related U.S. Application Data

(60) Provisional application No. 63/279,931, filed on Nov. 16, 2021.

(51) Int. Cl.
| *G02F 1/163* | (2006.01) |
| *G02F 1/155* | (2006.01) |
| *G02F 1/161* | (2006.01) |

(52) U.S. Cl.
CPC .............. *G02F 1/163* (2013.01); *G02F 1/155* (2013.01); *G02F 1/161* (2013.01); *G02F 2203/01* (2013.01)

(58) Field of Classification Search
CPC .......... G02F 1/163; G02F 1/155; G02F 1/161; G02F 2203/01; G02F 1/153
See application file for complete search history.

(56) References Cited

U.S. PATENT DOCUMENTS

| 2015/0207543 A1 | 7/2015 | Cooper et al. | |
| 2018/0090992 A1* | 3/2018 | Shrivastava | ............ H02J 50/20 |
| 2020/0033687 A1 | 1/2020 | Lam et al. | |
| 2020/0150802 A1 | 5/2020 | Krasnov et al. | |
| 2021/0040789 A1* | 2/2021 | Rozbicki | ................. G02F 1/163 |
| 2021/0200049 A1 | 7/2021 | Rozbicki et al. | |
| 2022/0021099 A1* | 1/2022 | Shrivastava | ............ H01Q 5/25 |

FOREIGN PATENT DOCUMENTS

| CN | 212749486 U | 3/2021 |

OTHER PUBLICATIONS

International Search Report and Written Opinion for related PCT/US2022/079990, mailed Mar. 23, 2023.

* cited by examiner

*Primary Examiner* — Tuyen Tra

(57) ABSTRACT

A smart glass window that receives power and control signals without physical wiring connections to the window simplifies the installation procedure, reduces wiring and labor costs and enables moving windows or movable glass curtain walls.

19 Claims, 10 Drawing Sheets

SMART GLASS WITH NEAR-FIELD WIRELESS CONNECTIVITY

CROSS-REFERENCE TO RELATED APPLICATION

This application claims the benefit of priority of U.S. Provisional Application No. 63/279,931 filed Nov. 16, 2021, the content of which is incorporated herein in its entirety.

BACKGROUND

Building wiring for 60-cycle power distribution is in most cases installed during the construction process from bulk wire stocks that are pulled into place, cut to fit and then configured and terminated by field personnel, typically union electricians, as part of the construction process. DC power systems for security or control are similarly but separately installed from bulk wire stocks that are pulled into place, cut to fit and then configured and terminated by field personnel, usually not union trained, as part of the construction process. Further security and specialty control systems are also similarly installed, but with even less training on the part of the installer.

In more formal and technologically advanced manufacturing processes, it is not unheard of to cut and terminate both power and control wiring as part of a separate manufacturing process physically away from the construction point and in advance of the actual building schedule. The premade wiring elements are fully tested, inspected and graded by quality control and then pulled into place and plugged into the equipment that requires connection at the optimum schedule point. However, such practices are typically reserved for aircraft and ship building processes where consistency and adherence to tight specifications and standards are too important to leave to loosely managed field installation personnel.

As technology is brought to bear against the threats of climate change and civil strife, more technically complex installations are requiring an evolution in the way buildings are constructed. One area in which the industry is evolving is windows. Smart glass windows provide many benefits over conventional windows, but they use wiring for power and control. Wiring for smart glass windows is installed in parallel to a building's power and communication wiring and terminated by hand at great expense.

BRIEF SUMMARY

Embodiments of the present disclosure are directed to a window with an electrochromic element that is powered and controlled without physical connections to building wiring.

An embodiment of a window includes an electrochromic assembly with an electrochromic layer, a first electrode and a second electrode, a first inductive coil coupled to the first electrode and the second electrode, the inductive coil being configured to be inductively coupled to a second inductive coil to receive AC power from the second inductive coil, a power converter configured to convert the AC power from the first inductive coil to DC power for powering the electrochromic layer, and a frame enclosing the electrochromic assembly, wherein the first inductive coil includes a conductive material disposed on a surface of a first sheet of glass within the window.

The window may further include a wireless receiver antenna disposed on a surface of the first sheet of glass and being made of a transparent conductive material, and a wireless communications processor coupled to the wireless receiver antenna. The wireless communications processor may process wireless communications received through the wireless receiver antenna.

In an embodiment, terminals of the wireless communications processor are coupled to conductive traces on the surface of the sheet of glass. The wireless communications processor may include a die that is bonded to the conductive traces.

In an embodiment, the window further includes a spacer located on a perimeter of the interior surface of the sheet of glass, a thickness of the spacer is greater than a thickness of the wireless communications processor, and the spacer provides a space between the wireless communications processor and adjacent structures.

Circuitry of the power convertor may include a window control device configured to receive control signals from the first inductive coil and control a state of the electrochromic layer based on the control signals.

In an embodiment, the electrochromic assembly is a first electrochromic assembly that includes a third inductive coil and the power convertor, the power convertor is coupled to the third inductive coil, and the third inductive coil is configured to transmit power to a fourth inductive coil. The window may further include a second electrochromic assembly with the fourth inductive coil coupled to a second power convertor, and a second electrochromic element that receives power from the second power convertor.

The window may include a switch with first and second electrodes and at least one visible element disposed on a glass surface of the window, the switch may operate using the DC power provided by the power convertor, and conductive lines coupling the DC power between the first and second electrodes of the switch and the power convertor may be transparent.

In another embodiment, a window includes an electrochromic assembly with an electrochromic layer, a first electrode and a second electrode, a first inductive coil configured to be inductively coupled to a second inductive coil to receive AC power from the second inductive coil, a power converter configured to convert the AC power from the first inductive coil to DC power for powering the electrochromic layer, and a frame enclosing the electrochromic assembly, wherein the first inductive coil includes a conductive material disposed on a surface of the frame.

The window may further include a wireless receiver antenna disposed on a surface of a sheet of glass and being made of a transparent conductive material, and a wireless communications processor coupled to the wireless receiver antenna, wherein the wireless communications processor processes wireless communications received through the wireless receiver antenna.

In an embodiment, terminals of the wireless communications processor are coupled to conductive traces on the surface of the sheet of glass. The wireless communications processor may include a die that is bonded to the conductive traces.

In an embodiment, the window includes a spacer located on a perimeter of the interior surface of the sheet of glass, wherein a thickness of the spacer is greater than a thickness of the wireless communications processor, and the spacer provides a space between the wireless communications processor and adjacent structures.

Circuitry of the power convertor may include a window control device configured to receive control signals from the first inductive coil and control a state of the electrochromic layer based on the control signals. In an embodiment, the first inductive coil is coupled to a passive transmitting coil that is configured to be inductively coupled to a first receiving coil disposed on an inner layer of the window.

The electrochromic assembly may further include a second receiving coil configured to be inductively coupled to the passive transmitting coil, and a second power convertor configured to convert AC power from the second receiving coil to DC power.

The electrochromic assembly may further include a second transmitting coil electrically coupled to the second power convertor and disposed on the second electrode of the electrochromic layer, wherein the second electrode is a ground plane of the second transmitting coil.

BRIEF DESCRIPTION OF THE DRAWINGS

The accompanying drawings are intended to convey concepts of the present disclosure and are not intended as blueprints for construction, as they are not necessarily drawn to scale: the drawings may be exaggerated to express aspects of detail. The figures merely describe example embodiments of the present disclosure, and the scope of the present disclosure should not be construed as limited to the specific embodiments described herein. The foregoing aspects and many of the attendant advantages of embodiments of this disclosure will become more readily appreciated by reference to the following detailed descriptions, when taken in conjunction with the accompanying drawings, wherein:

FIG. 7a is a plan view of the top of the movable door, showing the position of the inductive receiving coil in the middle of the frame. FIG. 7b is an orthogonal view of the bottom side of the window mounting frame, showing the position of a transmitting inductive coil on the inside surface of the frame. FIG. 7c is a partial elevation view of the movable door, showing the inductive receiving coil etched/deposited on the surface of the window glass. FIG. 7d is an orthogonal view of the top of the movable door, showing the relationship and connectivity between the inductive coil on the top recessed portion of the frame and the coil on the inside of the frame. FIG. 7e is a cutaway view of the middle of the movable door to show the three coils and their respective positions on the top of the frame, inside the frame and etched/deposited on the glass.

FIG. 8a shows an embodiment with one set of glass and attendant electrochromic layers and circuitry; FIG. 8b illustrates a similar embodiment with a plurality of the set of glass and electrochromic layers.

DETAILED DESCRIPTION

Figure 1:
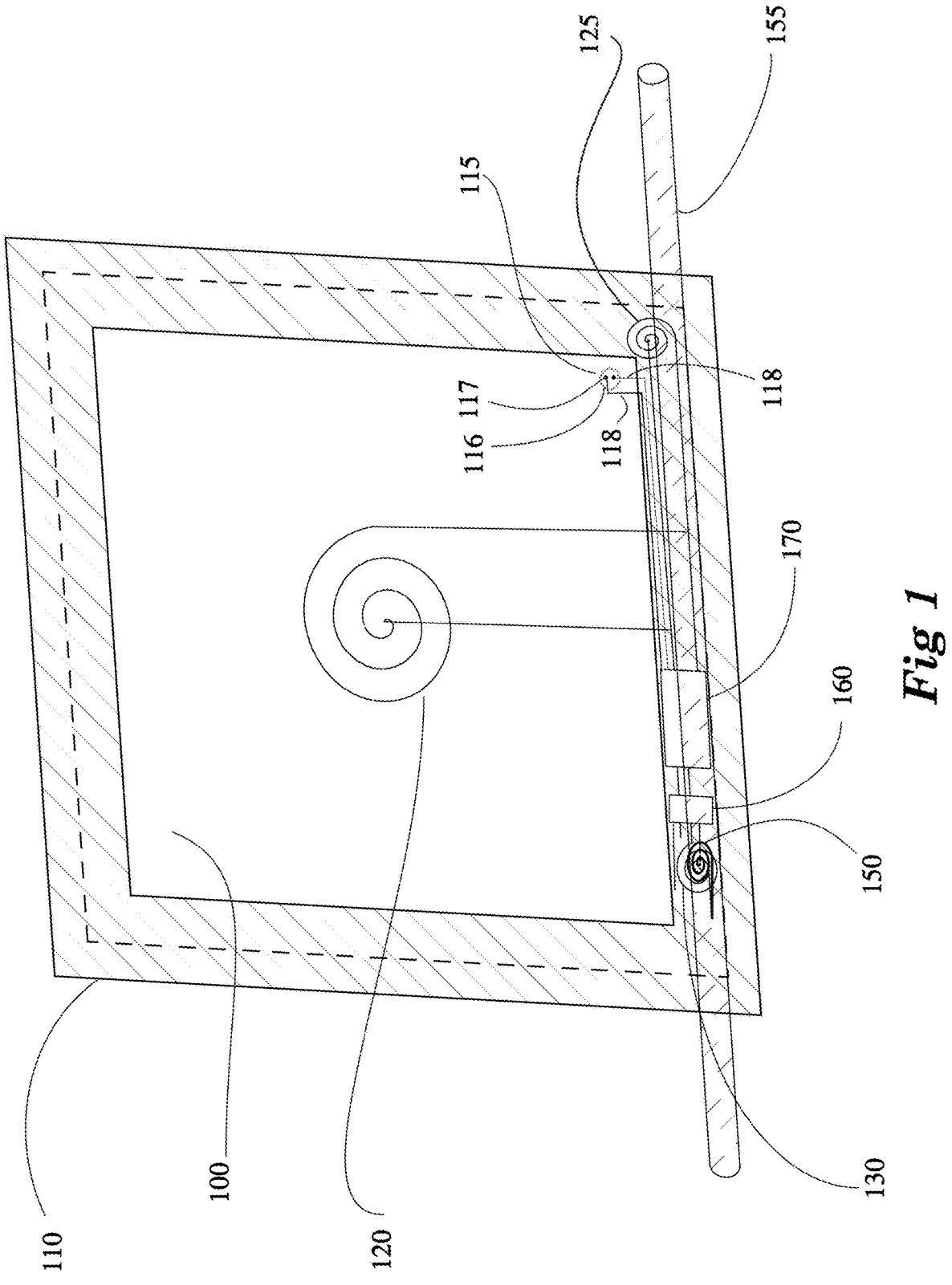
FIG. 1 is a rear perspective view of a pane of glass in a window frame, showing components of the Near-Field Wireless Power transfer and Control system.

The following list provides specific descriptions and examples of items that are present in the embodiments illustrated by the figures. The descriptions in the list are illustrative of specific embodiments, and should not be construed as limiting the scope of this disclosure.

| Reference | |
|---|---|
| Numerals | Description |
| 100 | Smart glass window |
| 101 | Optional self-cleaning coating on external side of outside layer of glass |
| 102, 106 | Glass layers |
| 103 | Low-E coating or Thermochromic treatment on inside of external glass layer |
| 104 | Electrochromic electrodes |
| 105 | Electrochromic layer(s) |
| 106a | Internal side of glass on which electronics are etched/deposited |
| 109 | Around the edge wiring between power circuitry and electrodes electrically connecting both sides of the glass. |
| 110 | Window frame, partially or completely non-conductive and RF transparent |
| 112 | Aggregate on-window supporting circuitry, including items such as 160, 170, 135, 136 |
| 115 | Pairing-enabling contact switch on stationary window glass with visible indicator circle |
| 116 | Visible switch circle |
| 117 | Switch touch or capacitive-to-the-glass contact point |
| 118 | Conductive traces |
| 120 | Control signal antenna on glass printed with conductive transparent ink linking control and communications |
| 125 | Control signal antenna on glass printed with conductive opaque ink linking control and communications |
| 130 | Inductive (receive) coil on frame delivering high frequency power to the tint control of the smart glass window |
| 135 | Driven coil (driven by receive coil 130) located on the inside of the frame |
| 136 | Receive coil located on the component side of the glass |

-continued

| Reference | |
|---|---|
| Numerals | Description |
| 137 | Connective conductor linking the passive receive antenna 130 and the passive transmitting coil 135 |
| 138 | Powered transmission coil driving additional electrochromic glass layers |
| 150 | Transmitting physical inductive coil and radio frequency up converter (60 Hz to 100 kHz to 400 kHz) power coupling transmitter near field antenna pre-constructed and pre-terminated as part of the pre-constructed and pre-terminated building wiring |
| 155 | Pre-constructed and pre-terminated building wiring with encapsulated Radio Frequency power coupling transmitters and transmitting antennas attached. |
| 160 | AC to DC power converter/DC to AC inverter and conditioning and switching circuits |
| 170 | Control and wireless communications processor |
| 180 | Inter-window spacer |
| 200 | Frame for mounting trolley-mounted, movable window |
| 210 | Smart glass window, trolley-mounted and movable |
| 211 | Smart glass panel tinting controlled to block only UV light |
| 212 | Smart glass panel tinting controlled so that it is translucent to block some visible light |
| 214 | Smart glass panel tinting controlled to block all frequencies so that it appears nearly opaque |
| 220 | Trolley V-Wheeled suspending window track system |
| 230 | Station for providing power and optionally communication signals |
| 240 | Bottom glass guide blades to facilitate travel in track 320 |
| 250 | Pre-terminated building wire with included pre-installed subsystem feeds |
| 260 | Wireless pairing switch to enable the pairing mode for each individual movable panel. The switch contact points are printed using transparent ink and will not be visible. The indicating circle is very faint. |
| 270 | Window guide track for supporting trolley V-Wheels |
| 310 | Open smart window stack where windows moved to the "open" position are disconnected from the inductive power coupling 460 |
| 320 | Floor guide track stabilizing the bottom of a movable window |
| 330 | Inductive receiving coupling coil to receive 100 kHz to 400 kHz power from the building power distribution system, built into top of sliding window 210 |
| 410 | Housing for the stationary transmissive coil 460 |
| 420 | Power delivery shaft between the power interface box delivering a 100 kHz to 400 kHz power signal to stationary transmissive coil 460 |
| 430 | Power interface box accepting a pre-terminated power cable, housing a 60-cycle up converter to a 100 kHz to 400 kHz power transmission signal |
| 440 | Power converter transmitter station metal mounting strips |
| 450 | Connector that mates to pre-terminated building wiring system |
| 460 | A stationary transmissive coil located over a parked smart window power receiver interface coil 330 |
| 510 | Trolley wheel to window frame mount |
| 520 | Trolley wheel V-grooved |
| 600 | Countertop on cabinetry under which an inductively-coupled powering or charging point 610 is positioned |
| 610 | A pre-terminated inductively-coupled powering or charging point |
| 710 | Inductive transmitting coupling coil to receive 100 kHz to 400 kHz input from coupling coil 330 and to transmit to inductive receiving coil 720, built into frame 200 of sliding door |
| 720 | Inductive receiving coupling coil to receive 100 kHz to 400 kHz power from coupling coil 710, deposited on the glass of sliding door 210 |
| 730 | Wiring between Inductive receiving coil 330 and inductive transmitting coupling coil 710 |
| 810/910 | Electrochromic assembly |

Creating wiring products designed and built in advance of installation in accordance with larger building design aspirations enable the use of non-traditional technologies that offer the potential to reduce costs and make way for newer greener solutions than traditional practices allow. Such is the case for near-field inductively coupled non-contact connections for control and power transfer. Designing non-contact connections into building wiring with companion connectivity designed into building subsystems such as smart windows, lighting, HVAC and security, offer the potential to greatly reduce construction, maintenance and support complexity and costs. Accordingly, embodiments may be implemented using pre-terminated wiring that is readily installed in a new building, or retrofitted to an existing building. However, it is not necessary to use pre-terminated wiring—in some implementations, components such as inductive coils can be installed in existing buildings and attached to power wiring already present in the building.

Practices such as design to include the fine specification of connective power and control enable the use of technologies such as printed electrical circuits using conductive inks. These technologies offer the potential to dramatically reduce costs, reduce the use of scarce resources such as copper and reduce the weight of buildings. Reducing the weight using advanced materials and technologies further reduces the potential costs and environmental impacts of providing adequate housing for the world's population.

Conductive ink printed on glass to form Radio Frequency (RF) inductive-coupling electrical power transfer and signaling connections can greatly simplify the connective installations of most electrically powered and controlled subsystems found in residential, commercial and industrial facilities. Conductive traces on the glass can also simplify the manufacture, installation, and transportation of smart glass windows, and reduce potential failure points of the windows. Conventional smart windows use solder connections to attach power and control circuitry to the glass, and solder connections to conventional round wires are susceptible to mechanical failure.

Efficiencies of implementation are found when cabling is designed for a specific connection through a specific route through a structure's interstitial spaces which can themselves be optimized by using CAD technologies for efficient packing and access.

Such an approach to power and control of a structure's supporting cabling minimizes waste during construction, optimizes the use of space within the building, reduces the weight of the total building system, minimizes maintenance and support costs and reduces construction time. In some buildings, DC power and control systems are as large or even larger than AC wiring systems, so integrating power delivery to DC devices and using wireless control or control signaling transmitted through AC wiring can massively reduce the amount of wiring necessary to power and control smart glass windows.

Embodiments of the present disclosure include pre-terminated, pre-manufactured building cabling and Near-Field Wireless Power Transmission (NFWPT) in the bands of 100 kHz to 200 kHz, or even 300 kHz or 400 kHz, to deliver operating power without a physical connection to selected subsystems such as smart windows, position switches, lighting control, door or entry way security, etc. Certain devices such as security devices may be movable or placed to monitor the movement of a barrier such as a door. Embodiments may use low-power unlicensed signaling bands such as 900 MHz, 2.4 GHz, 5 GHz, etc., to allow controlling systems to be remote from the controlled entity, such as smart glass, in a pig-tail free communication system for controlling aesthetic/comfort/safety systems such as smart glass windows, lighting, HVAC and security.

Wireless transceiver circuits typically include unique individual (MAC) addresses that identify each subcomponent. Support software enables the organization of each subcomponent (e.g., a smart glass window) into a logical relationship for the user or facility occupant. For example, smart glass subsystems may include appropriate transmitting antennas located near the closed window position for a moving window system or near a fixed window and antenna systems located on the glass window created using conductive inks which are also used to connect to receiving circuits printed on the glass using transparent or opaque conductive inks, depending where on the glass the antennas are located.

Such systems may be implemented using pre-terminated power distribution and signaling cabling with factory integrated connectors and end effectors such as smart glass windows, switches, thermostats, locks and lights to manage subsystems such as security, HVAC, food storage, laundry, cooking and other residential or industrial equipment.

Smart glass is a glass product that changes its light transmission characteristics in response to an electrical charge. For example, smart glass can be activated to selectively filter portions of the UV, IR or visible light spectrum. In some embodiments, smart glass provides a first light transmission characteristic in a default uncharged state, and a second light transmission characteristic in an electrically activated state. Examples of smart glass are glass that applies or removes various levels of tinting, filters or stops filtering IR frequencies, filters or stops filtering UV frequencies, changes color, changes from transparent to colored, or changes from colored to transparent, in response to an electrical charge. In some implementations, smart glass provides the changed transmission characteristics as a gradient or only to limited areas of the glass.

One embodiment of the use of a pre-terminated wiring and transmitting system is the control of smart glass windows. Using NFWPT power and wireless signaling, smart glass can be controlled to vary its transmittance over several different electromagnetic wavelengths. This disclosure reveals how this control can be implemented while minimizing the cost of the building wiring to accommodate the control system for the glass. The glass may be stationary glass as in a fixed position window, or moving glass panels implemented as a folding or sliding door.

Figure 2:
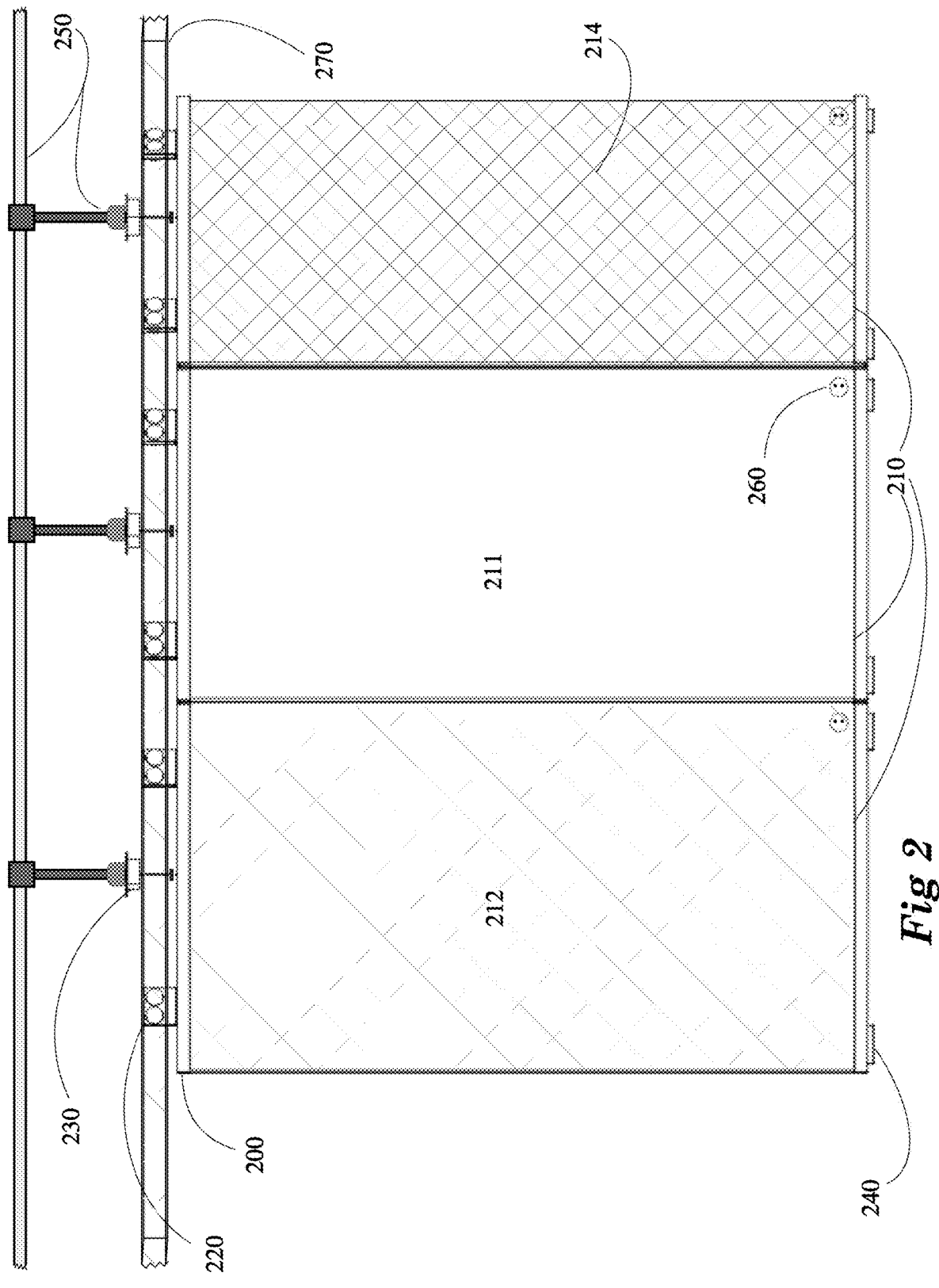
FIG. 2 is an elevation view of a movable glass curtain wall with wireless power distribution in position to power the smart glass in the closed or home position.

In an embodiment, software applications such as IoT or building control software may be used to separately control the transmission of infrared, visible and ultraviolet light to enable the use of solar warming or blocking solar heating while allowing or blocking visible light or a portion of the visible light spectrum from entering the residence or facility. As illustrated in FIG. 2, each panel of a set of smart glass windows can be controlled separately, potentially using different control points of the electrochromic glass. Items in FIG. 2 represent three different states of electrochromic glass—lightly translucent tinting 212, transparent tinting while blocking infrared 211, and heavy tinting 214 which renders the glass opaque.

As shown in FIG. 1, a plurality of conductive traces 118 are disposed on a surface of the glass of a smart glass window 100 so that the insulative glass material acts as a circuit substrate or board. The conductive traces 118 may be formed of a transparent conductive material such as indium tin oxide (ITO), tin oxide, indium oxide, titanium nitride, zinc oxide, tin, copper, graphene, or other conductive materials as known in the art. In the case of materials such as copper, the materials may be applied with minimal thickness so they are entirely or mostly transparent, especially in visible regions of the smart glass window. In other embodiments, at least a portion of the conductive traces 118 are opaque. For example, in the embodiment illustrated in FIG. 1, the wireless antenna 120 may have substantially transparent conductive traces 118, while other traces that are hidden from view by the window frame 110, including traces for antenna 125, can be opaque. The conductive traces may be applied by known methods including sputtering, chemical vapor deposition, and by printing a conductive ink.

One or more sheet of glass of the window 100 may serve as a substrate for a circuit that includes a power phase comprising a first inductive coil 130 that receives power from second inductive coil 150 which is attached to building wiring 155, a power convertor/inverter and conditioner 160, a processor 170, a transparent wireless antenna 120, a contact switch 115 and an opaque wireless antenna 125.

The first inductive coil 130 is positioned with respect to the second inductive coil to facilitate wireless inductive power transfer from the second coil 150 to the first coil 130. Accordingly, coil 150 is oriented to be parallel to coil 130, and the coils are close enough to each other to facilitate inductive coupling. To accomplish this, the building-side coil 150 may be positioned within a pocket of window frame 110, or located within the building wall in a position that is within the near field of window coil 130.

Figure 10:
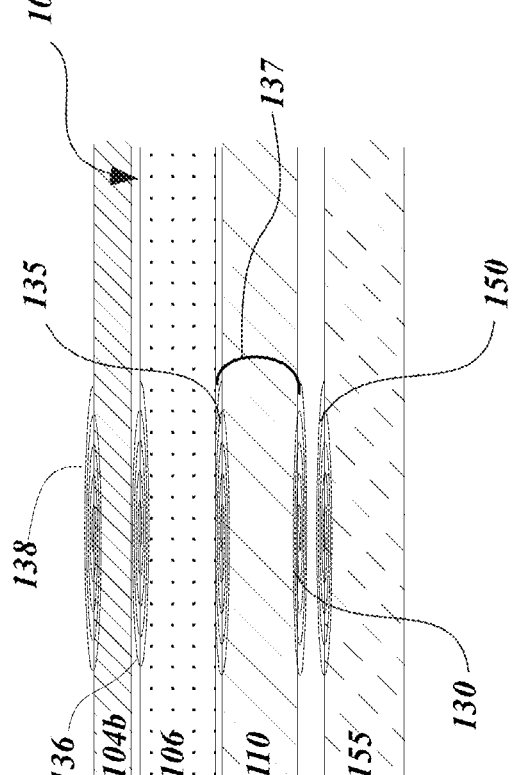
FIG. 10 shows a detailed view of a portion of FIG. 1. It is a top view of the relationship of the power wiring, the frame and window and the inductive coils within each layer.

In an embodiment, receiving coil 130 is located on the frame 110. When the frame 110 is a conductive material, coil 130 may be on an exterior face of the frame, electrically isolated from the frame by an insulating material, and painted or coated with a protective coating. In such an embodiment, coil 130 can be passively coupled to a transmitting coil 135 through wiring 137 as seen in FIG. 10 to provide power to interior layers of the window 100.

In some embodiments, the alternating current in the building wiring 155 used to power the window 100 is modulated (out of band, i.e., a higher frequency signal rides on a lower frequency carrier) to provide control signaling to control one or more window 100. For example, the power provided to second inductive coil 150 may be frequency or amplitude modulated, and that modulation may be interpreted by window circuitry as a control signal to change a transmission characteristic of one or more coupled smart glass window 100.

In such an embodiment, a group of windows can be controlled by a central controller coupled to a building's wiring. The central controller may simultaneously control all smart windows 100 in a building, all windows on one floor of a building, all windows within a single bank of windows, or all windows within a room, using signals transmitted through AC power wiring. Accordingly, embodiments can be adapted to accommodate various control schemes.

The convertor/inverter 160 receives AC power from the first inductive coil 130 or 136, depending on the configuration, and converts the power to DC power using, for example, a rectifier circuit. In addition, power convertor/inverter 160 may transform the voltage of the power, and provide conditioning as appropriate to provide power to downstream components including the processor 170. In an embodiment, circuitry of the power convertor/inverter 160 includes a window control device configured to receive control signals from the first inductive coil 130 and control a state of the electrochromic layer based on the control signals.

In addition, the convertor/inverter 160 may include control circuitry which interfaces power, window tinting switch and controller elements. All or a portion of the control circuitry may be applied directly to a surface of the window glass using conductive traces 118, and power or control circuitry may include electronic components that are printed onto the window glass or applied by a pick-and-place process and coupled to the conductive traces.

When the smart glass window 100 has wireless communication capability, the processor 170 may include at least one die for processing the wireless communications. Wireless communications may be made using a suitable protocol such as BLUETOOTH, ZIGBEE, Z-WAVE, Wi-Fi, a 3GPP telecommunications protocol, or any protocol used for wireless IoT or smart home control. In an embodiment, processor 170 is a system on chip (SoC) component with separate memory and processing dies coupled through an interposer.

The processor 170 may store an identifier that identifies a specific window 100 so that each window can be separately controlled using wireless signaling, or by a signal that is broadcast to multiple windows. For example, control signals may be broadcast through a building-wide communications system, and the control signals may include identifiers that window control systems can read to determine whether the controls are intended for a particular window or set of windows. In another embodiment, the unique identifiers are used for individual window control using a wireless controller such as a cell phone that transmits signals that can be heard by multiple windows. One example of an identifier is a MAC address. In some embodiments, an identifier is shared by multiple windows so that the windows can be controlled in unison.

The processor 170 may have a solder ball array that electrically couples the processor to conductive traces 118 to be electrically coupled to other components of the window 100. In an embodiment, the solder ball array is fused to the conductive traces 118 using an ultrasonic process that minimizes thermal disruption of electrochromic materials. In another embodiment, the processor is coupled to traces 118 using a conductive adhesive.

When the processor 170 or other circuit components are applied as unpackaged dies, the dies may be covered with a polymeric protective coating. The protective coating may be a two-part thermoset material such as an epoxy or polyester, or a UV-cured polymer, to minimize heat exposure to the smart glass. The protective material may extend over and protect multiple circuit components including portions of the conductive traces 118.

Components for processing wireless communications may be disposed on the same die as components for controlling the window, or on separate dies, within processor 170. When window control is provided on a separate die from wireless processing, both dies may be separately mounted on conductive traces 118 and communicate with one another through conductive traces 118. The processor 170 may also control the transmissive state of smart glass window 100 using power provided to electrodes of the smart glass using conductive traces 118.

In an embodiment, window electrodes are powered by power output terminals from power convertor/inverter 160, which are controlled by a control signal from processor 170. Accordingly, the processor 170 may receive power from power convertor/inverter 160 over a first conductive trace 118 running between an output terminal of the power convertor and an input terminal of the processor, and transmit control signals to control circuitry of the power convertor using a second conductive trace running between an output terminal of the processor and an input terminal of the power convertor.

Circuit components and conductive traces 118 may be affixed to a layer of glass in window 100 at the time the glass is manufactured, near the edge of the glass where the glass is covered by the window frame 110. The location of the mating Near-Field Wireless Power inductively coupling coil 150 may be the same for all windows.

Although individual building alternating-current power-distribution wiring systems may accommodate capacitively coupled out-of-band high-frequency signaling riding on the power alternating current, transparent conductive inks could be applied directly to the viewing portion of the window to enable direct wireless connectivity in addition or as an alternative to signaling through power systems.

The window 100 may include an antenna 120 for wireless communication that is disposed directly on a glass surface. In an embodiment in which the antenna 120 is located within a viewing pane of the window 100, the antenna is made of a transparent conductive material which is printed or otherwise deposited onto a surface of the glass using conductive traces 118. The antenna 120 illustrated by FIG. 1 has a spiral shape and is located in the middle of the window, but embodiments are not limited to this configuration. In other embodiments, the antenna 120 may have a shape with orthogonal linear elements, or the antenna may include one or more conductive traces 118 running around edges of the viewable part of the window.

Also illustrated in FIG. 1 is an opaque antenna 125 that is used for wireless communications. The opaque antenna 125 is disposed directly on a glass surface of the window 100, and may be made of a material with a sufficient thickness to be opaque. In FIG. 1, the opaque antenna 125 is obscured from view by part of the frame 110. The opaque antenna 125 may be present in addition to, or as an alternative to, the transparent antenna 120 to receive and/or transmit wireless communications. For example, in an embodiment, opaque antenna 125 may be a BLUETOOTH transceiver, and antenna 120 may be a Wi-Fi receiver, providing parallel communication systems for the window.

In the embodiment of FIG. 1, a portion of the frame 110 extends to cover an outer edge of the glass. In another embodiment, an opaque element covering the circuitry is applied directly to the glass, e.g. by an adhesive or as a coating separate from the frame. The opaque covering may be a radio transparent material such as a polymer. In an embodiment in which an opaque antenna 125 is covered by part of the frame 110, at least the portion of the frame that covers the antenna is a radio-transparent material. Part of the frame 110 may cover circuitry including the processor 170, power antenna 130, power convertor/inverter 160, and at least a portion of conductive traces 118.

In another embodiment, as indicated in FIG. 8, at least a portion of the circuit components on the window 100 are disposed on a portion of a sheet of glass 106 that is protected by a peripheral-crush inter-window spacer of sufficient height to offer protection to components attached to glass 106. Further, as depicted in FIGS. 8 and 9 the electrode 104a may not extend over the top of the transmitting antenna, but the electrode 104b may extend between the two antennas to provide isolation.

In another embodiment, electrical components may be located on a visible part of the glass within the frame 110. In such an embodiment, the use of transparent conductive traces 118 could reduce the extent to which circuit components are visible.

When the building wiring is designed after the placement of the windows is fixed, then the building wiring may be routed such that the inductive coupling for the windows are in-line components of the primary building wiring and not a separate wiring system. If the windows are tracked, pivoted or folded, then the transmitting side of the power and signal coupling is located at the window's home or parked station, e.g. in a closed orientation. This enables the window 100 to be powered for functional tinting or filtering operations when it is functioning as an environmental barrier and not open. Physical connecting wiring is eliminated from the moving windows (i.e., "pig-tail free"), thus reducing the opportunity for wiring or connection failure and reducing the amount of DC power wiring within a building.

The signaling (control and communications) RF coupling element 120 (the antenna) may be printed using a transparent conductive material on a glass surface in a window laminate such that it is protected from any cleaning activity on the glass 100 in the occupied space. Accordingly, the antenna 120 may be located on a surface that is not exposed to an interior or exterior of a building, or may be covered by a protective layer.

In order to deploy this technology, building wiring may be engineered and premade to fit specific routing locations, and specific cabling constructions may provide one or more inductive loop integrated into the wiring 155. The inductive loops 150 can deliver power to activate electrochromic elements of the smart glass as well as any electronic components used by the associated smart glass panel.

When only one inductive loop 150 is provided in both the building wiring 155 and a window 100, the inductive coupling may be disrupted when the window is moved from a closed position to an open position. When the window 100 opens and closes by sliding, this behavior could be mitigated by providing two or more inductive loops 130 on a window that align with the building wire loops 150 at various positions, e.g. open and closed. On the other hand, moving a window means opening the window and exposing the outside environment, negating benefits of smart glass. In this case, a single coil may be provided with the window, and breaking inductive coupling with a wiring coil is an acceptable condition.

In an embodiment in which a window 100 is capable of wireless communication that employs a pairing protocol, such as BLUETOOTH, pairing may be initiated by touching a switch 115 disposed on an exterior surface of the window glass. Within the circle 116 of switch 115 shown in FIG. 1 there is a pair of contacts 117, that when shorted together by a finger or some low impedance material, will alert the processor to enter the pairing mode with user equipment (UE). This action could provide robust registration between a UE and a window panel, reducing unintended or malicious control of the window. The switch 115 could serve other functions such as allowing a user to manually activate or deactivate electrochromic elements of a smart window.

In another embodiment, switch 115 is provided on an interior glass layer, and is a capacitive switch that detects changes in a capacitive field around the switch, so it is not necessary to have the switch on an outer glass layer. The switch 115 may be coupled to control wiring disposed on the same glass layer as the switch, or routed over an edge of the glass to a different layer.

A switch 115 may comprise at least one visible element that indicates the location on which a user should place a finger to use the switch. For example, the switch may include a visible marker 116 that indicates an area in which a finger should be pressed to activate the switch, and/or the electrodes 117 of the switch 115 may be visible.

The switch 115 may be printed or otherwise deposited onto the window glass as discussed above with respect to the conductive traces 118. While the marker 116 shown in FIG. 1 is a circular line, the marker could have other shapes—for example, a marker may be an opaque filled circle or oval. When marker 116 is opaque, the electrodes 117 may be transparent, or opaque and indicated by a different color from the marker 116. Of course, other embodiments are possible so long as the location of the switch 115 is apparent to a user.

Figure 6:
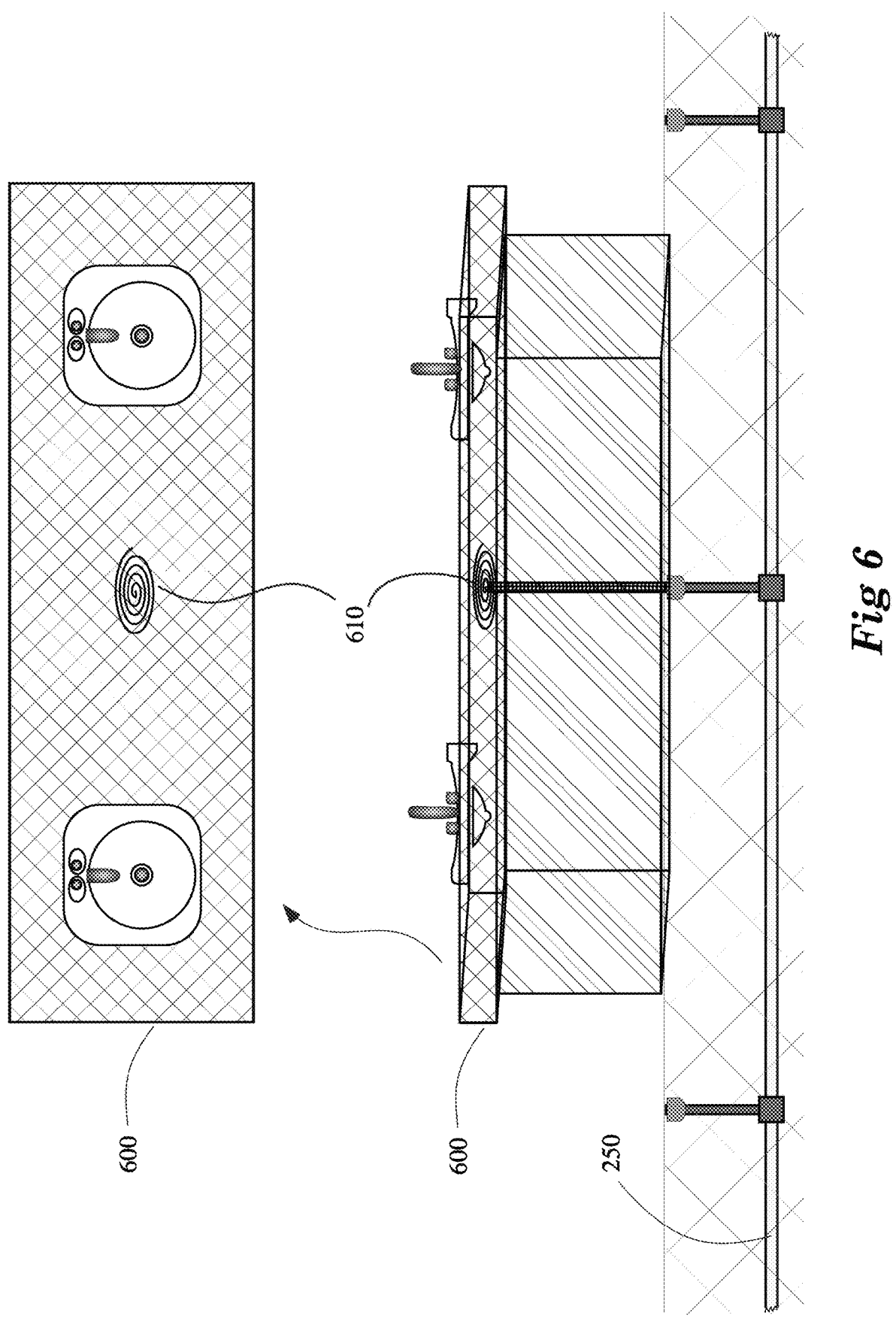
FIG. 6 illustrates an implementation of pre-terminated and pre-configured inductive-power coupling device intended to enable, power or charge a controller device (e.g., a cell phone) as a component of the pre-constructed building wiring that is routed through the building cabinetry. It shows an elevation view of a cabinet/counter with a coil embedded under the countertop; it includes an inset that shows a plan view of the countertop and the positioning of the coil underneath and between countertop features.

As illustrated in FIG. 6, remote controllers that communicate with a communications antenna 120 or 125 could be battery powered and truly portable or temporarily fixed at locations where power for the controllers themselves may be provided by pre-terminated and pre-fabricated extensions to the building wiring. An example of a remote controller is a consumer device such as a cell phone which can be carried and then placed on a built-in inductively-coupled charging station 610 configured within cabinetry 600 in offices, a residence or housing facility. In another embodiment, the remote controller is a dedicated device for controlling smart windows.

FIG. 8 illustrates an embodiment of various layers that are present in a window 100. The outer sheet of glass 102 may be coated with a layer 101 of a self-cleaning material for an exterior face of a building. Layer 103 is a thermochromic layer for which transmission characteristics change in response to temperature or a Low-E coating layer.

First electrode 104a is an electrode for electrochromic layer 105, and is separated from thermochromic layer 103 by a space which may be a voided gap, which may be evacuated of air and filled with an inert gas such as argon or krypton. A second electrode 104b may be disposed on an opposite side of electrochromic layer 105 from the first electrode 104a. The electrochromic layer 150 and electrodes 104a and 104b may be an electrochromic assembly. Electrochromic assemblies can include multiple layers of electrochromic elements. Although only one space is shown in the figure, multiple spaces may be present between various layers, as depicted in FIG. 8b.

Glass layer 106 is adjacent to the second electrode 104b. In an embodiment, circuitry 112 is disposed on surface 106a of glass layer 106. As shown in the figure, circuitry 112 may be disposed on the inner side or disposed on the outer side of the glass if provisions are made to transmit power and signal through the glass or conduct around the edge of the glass using conductive inks, vapor deposited conductors or adhesively attached conductors. Inter-window spacer 180 with sufficient thickness to protect the electrochromic layer and the added circuitry may be laid around the periphery of the window in multiglass layered windows.

However, embodiments are not limited to this configuration—for example, in another embodiment, the surface on which circuitry 112 is disposed may be located on the outer face of the window so that the inductive coil 130 on the surface is sufficiently close to coil 150 of the building wiring to provide inductive coupling between the coils. Power and signal would then be coupled around the edge of the glass using thin metallic conductors, conductive inks or polymers.

Figures 8A, 8B:
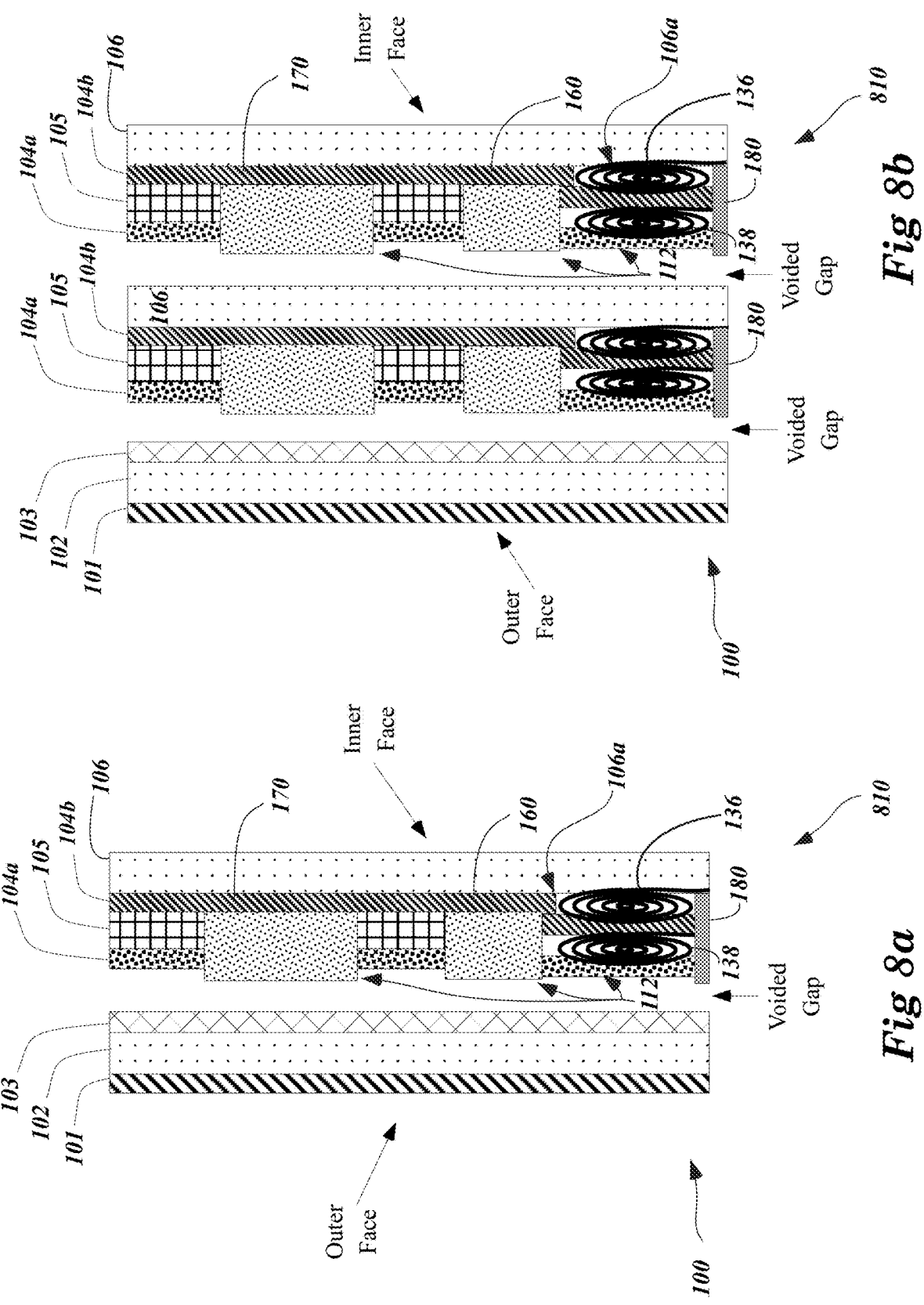
FIGS. 8a and 8b are cross-sectional views of one end of a window 100.

In another embodiment, as shown in FIG. 8b, the layers 810 shown to the right of the Voided Gap could be repeated as many times as desired such that each repetition 810 would add another complete electrochromic assembly. Power from the transmit coil 150 drives two electrochromic glass sheets in series, but the two glass layers would be controlled as a single entity.

Circuitry 112 is optionally coupled to electrodes 104a and 104b by wiring 109 instead of inductive coupling of power and signal through the glass. Wiring 109 may transmit control signals in addition to, or in place of power. In an embodiment in which electrochromic assemblies 810 are provided as pre-fabricated materials, specific transmit and receive coils 136 and 138 may be deactivated, and power and/or communication signals that would otherwise be communicated by inductive coupling are handled by wiring 109.

Wiring 109 may comprise one or more flat copper wire that transfers power from circuitry 112 to the electrodes 104a and 104b to control the transmission characteristics of electrochromic layer 105. The flat wires may be metallic, polymer or ink residue with sufficient current-carrying capability. Multiple conductive flat wires 109 may be disposed beside one another, and parts of wires 109 that terminate at first electrode 104a may be coated with an insulating material as they pass over second electrode 104b. Although the wiring 109 in FIG. 8 is routed over a bottom edge of glass sheet 106, in another embodiment, the wiring is routed over a side edge of the glass.

Wires 109 running to respective electrodes 104 may be stacked on each other and separated by an insulating material. A portion of the wires 109 including an edge portion may be printed on glass 106. In an embodiment in which wires 109 are a flat conductive material, the flat material may be compressed between a glass layer 106 and mounted components 112 using a conductive adhesive to provide physical and electrical contact to circuitry 112 without the use of solder or other thermal processes.

Flat wires may have a thickness on the order of microns or thousandths of an inch, and have widths or lengths from fractions of an inch to multiple inches or centimeters. In an embodiment, the flat wires may extend for a significant portion of the width of the window 100. Although thermochromic materials are generally passive, in the case that powered elements are present in a thermochromic layer 103, additional wiring 109 may be routed to those elements.

Figures 9A, 9B:
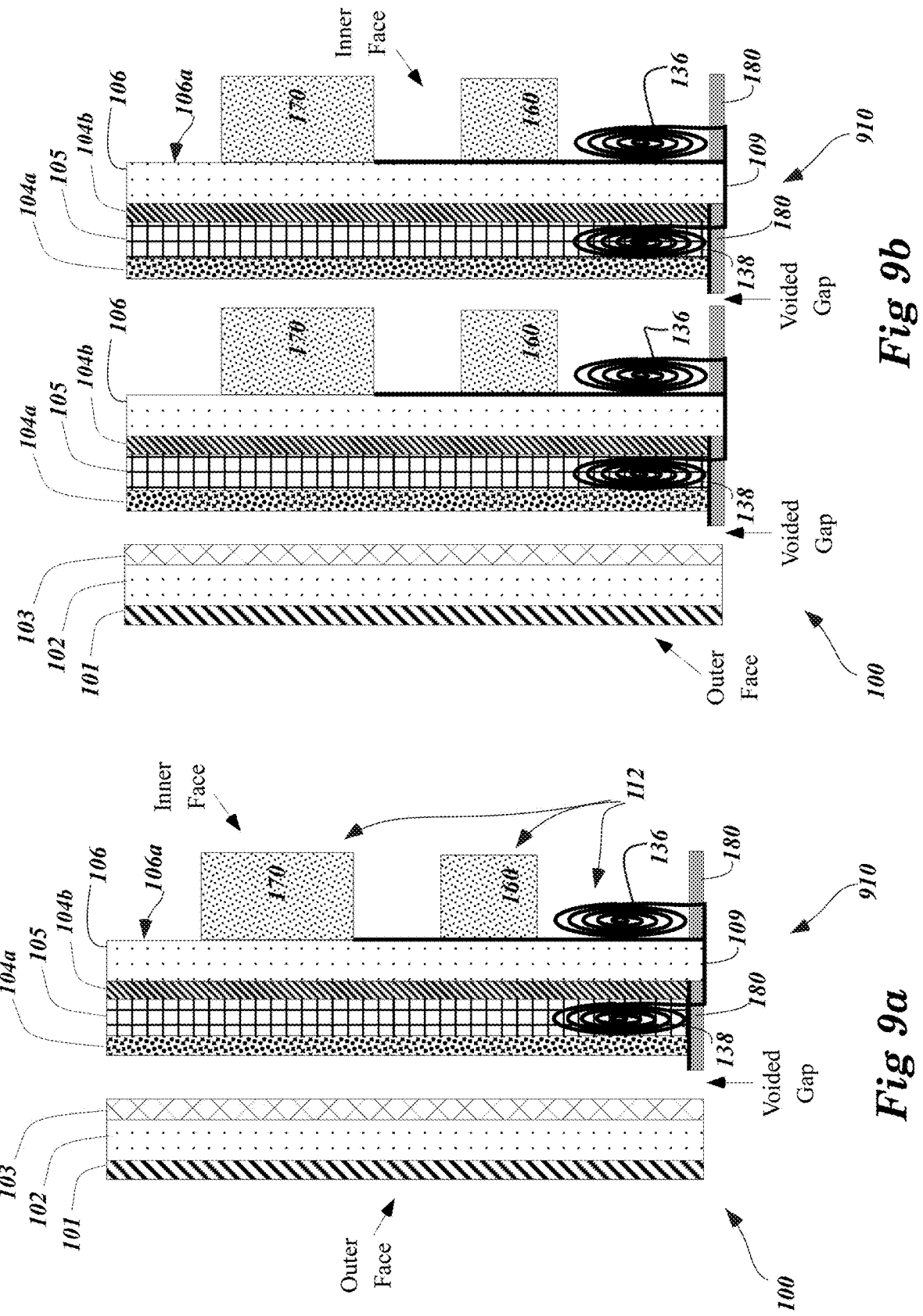
FIGS. 9a and 9b show an alternate configuration with the electronic circuits and receive antenna on the inside of the glass and the electrochromic layers and the optional transmission antenna on the outside of the glass with an around the edge connection for both power and signal.

The window layers shown in FIGS. 8 and 9 are merely exemplary, and other layer configurations are possible. Emerging technologies provide increasingly thin glass layers, which increases possibilities for the number of layers that can be present in a window otherwise constrained by thickness and weight considerations. It is possible for multiple electrochromic layers to be present in a window 100 as indicated in FIGS. 8b and 9b, each layer providing a different transmission characteristic, or for no electrochromic layers to be present. When no thermochromic layer is present, the electrochromic elements 104 and 105 may be disposed in the same location of the thermochromic layer 103 in FIGS. 8 and 9, e.g. close to the outer face of the window.

Regardless of the exact position of an electrochromic layer 105 in a window stack, a glass layer 106 within the window may have circuitry 112 located on a surface 106a, and coupled to the electrodes 104 by conductive wiring 109 and/or inductive coil pairs 136 and 138.

Figures 4A, 4B:
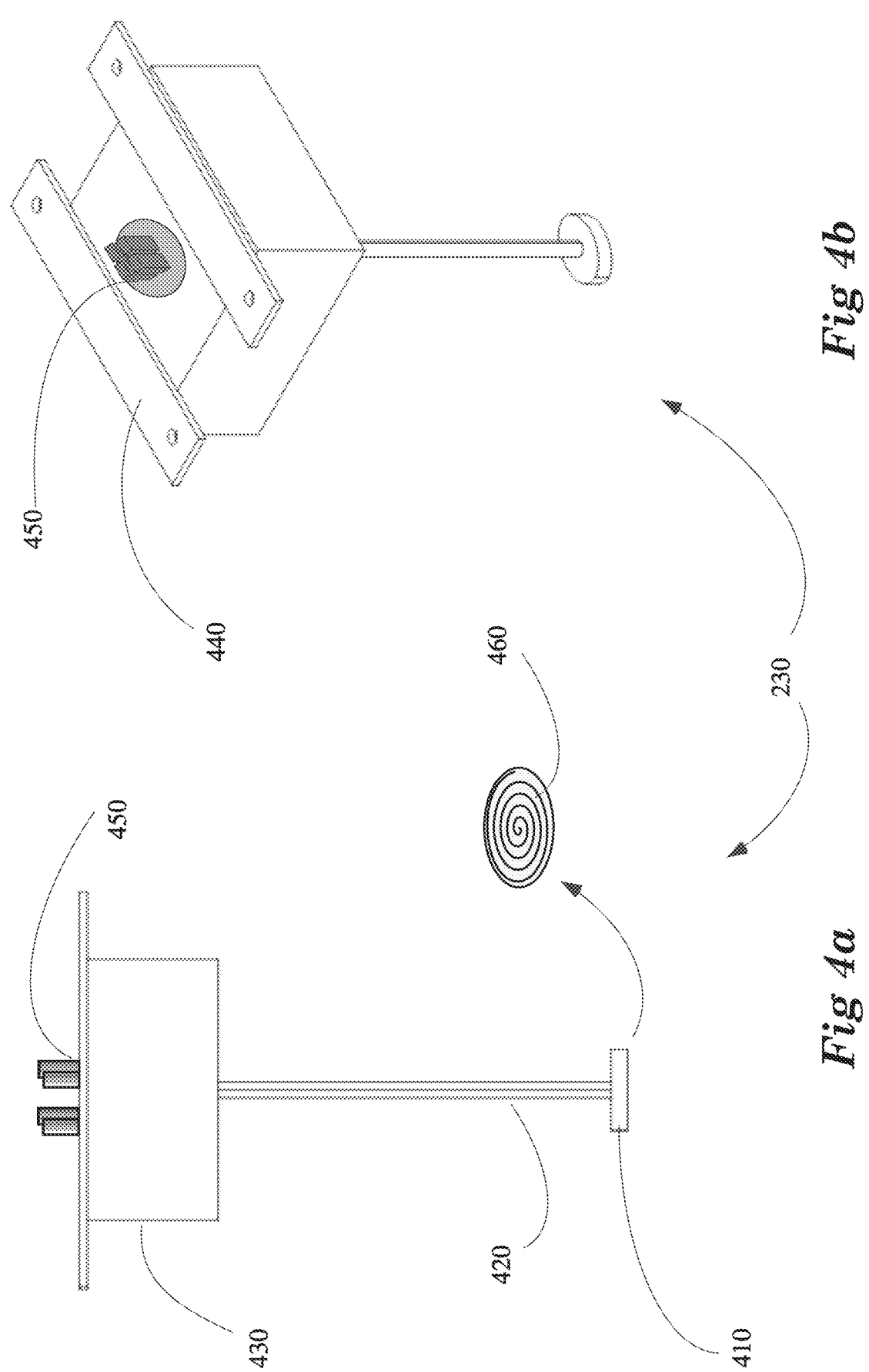
FIG. 4a is an elevation view of the power distribution box that houses the 60 Hz to 150 KHz converter and the drive circuits that power the inductive coil transmitter. An inset displays the inductive coil on the bottom side of the transmitter.
FIG. 4b is an orthogonal view of the input power connection to the frequency transformer and the drive power circuits.

Another embodiment involves the use of a plurality of glass panels 210 to form a folding or sliding glass "curtain" or patio door, as depicted in FIG. 2. Each of the panels 210 can be controlled separately, via a station 230 (see FIGS. 4a and 4b) which encompasses a power connection 450 to building power, a power interface box 430 to accept pre-terminated power cable wiring, a stationary inductive coil 460 housed in an isolating housing 410, and a power delivery shaft 420 to deliver the power from the power interface box 430 to the stationary inductive coil 460. This station 230 may remain stationary, regardless of the position of the door panel 210. Power and/or control signals may be transmitted to the door panel 210 via an inductive receiving coupling coil 330 mounted above or below the panel when the door panel is in position beneath the stationary signal transmitting station 230. Although coil 460 is shown as orthogonal to shaft 420 in the figures, in another embodiment, coil 460 is oriented parallel to shaft 420, for example when attached building wiring located below a window.

Figures 3A, 3B:
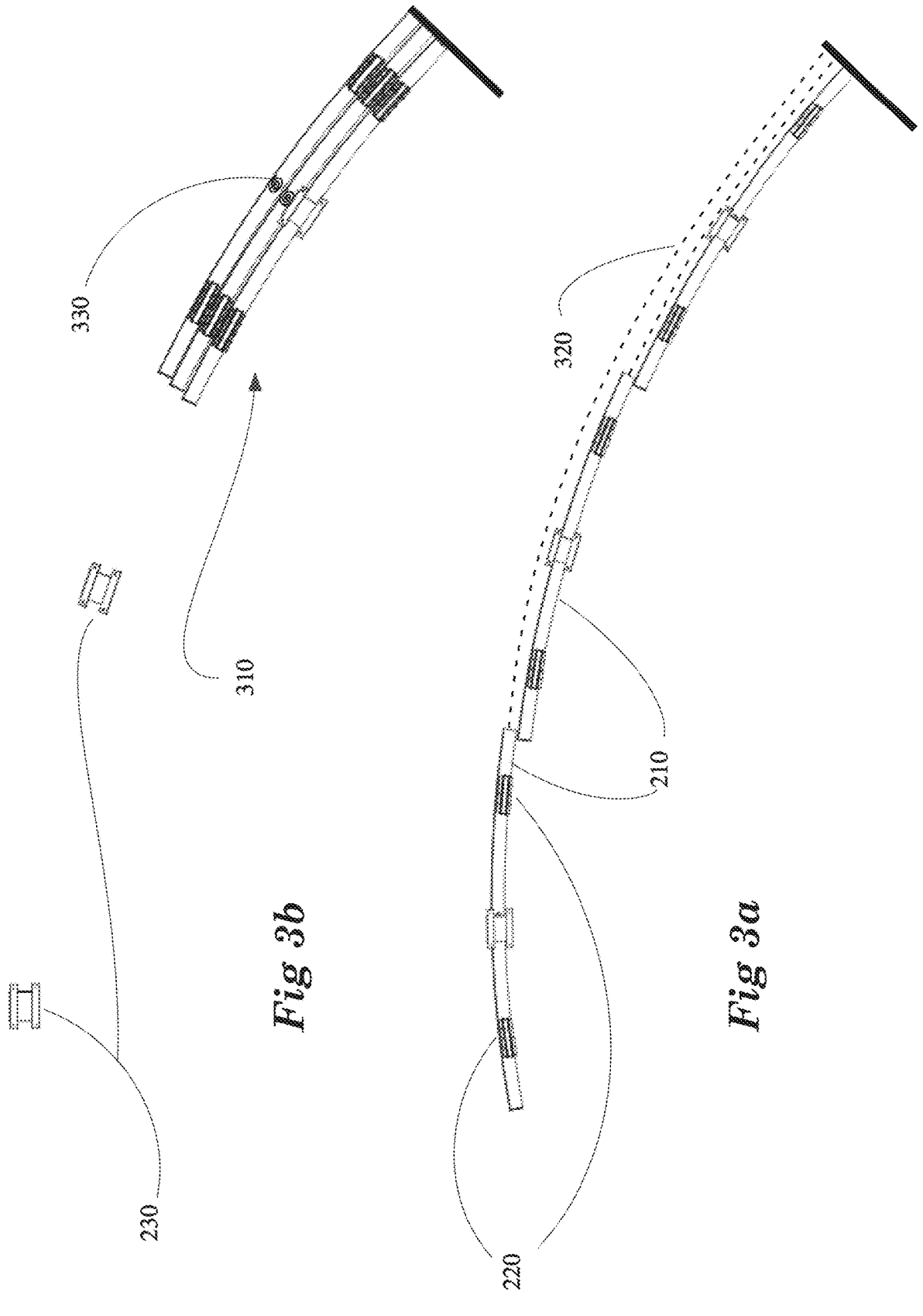
FIG. 3a is an overhead view of the curtain wall in the closed position, showing the tracks in the floor where the individual glass panels are restrained in one direction.
FIG. 3b is an overhead view of the curtain wall in the open position where only the end panel is powered from the overhead proximity wireless connective power dispersion system, while the proximity power points for two unpowered panels are vacant.
Figures 5A, 5B:
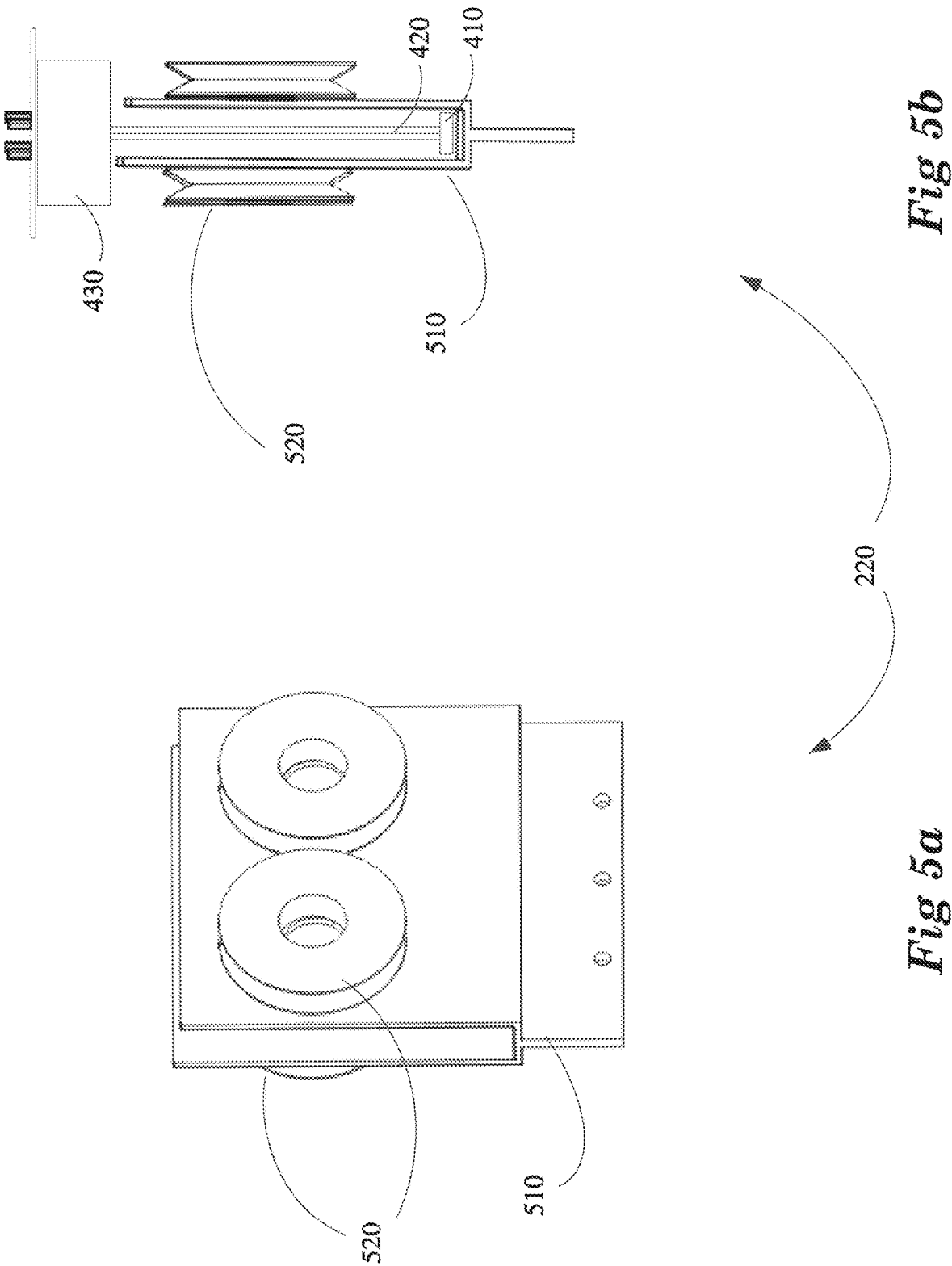
FIG. 5a illustrates one of the wheel sides of the trolley suspension arms of the window track guidance system.
FIG. 5b shows the grooved wheels of the trolley suspension system of the windows track guidance system, shown with the inductive coil housing of the power distribution box fitting through the U-shaped channel of the trolley.

The door panels 210 can be moved on a track or floor guide 320, facilitated by bottom guide blades 240 and suspension trolley V-wheels 220 supported on an upper window guide track 270, which may be installed in or hung from a ceiling. FIGS. 5a and 5b illustrate some features of the trolley and V-Wheels. To open the glass curtain or door, the panels 210 would be moved out of the way and folded or stacked on one side 310 of the opening, as shown in FIG. 3a. When the window is open, the link between the stationary transmitting station 230 and the receiving coil 330 is broken until the displaced door panels 210 are moved back into position beneath the stationary power transmitting station 230, thereby restoring power delivery to the panels.

As in the embodiment of FIG. 1, the glass panels 210 each have a switch 260 that provides control of each panel by the intended user.

Figures 7A, 7B, 7C, 7D, 7E:
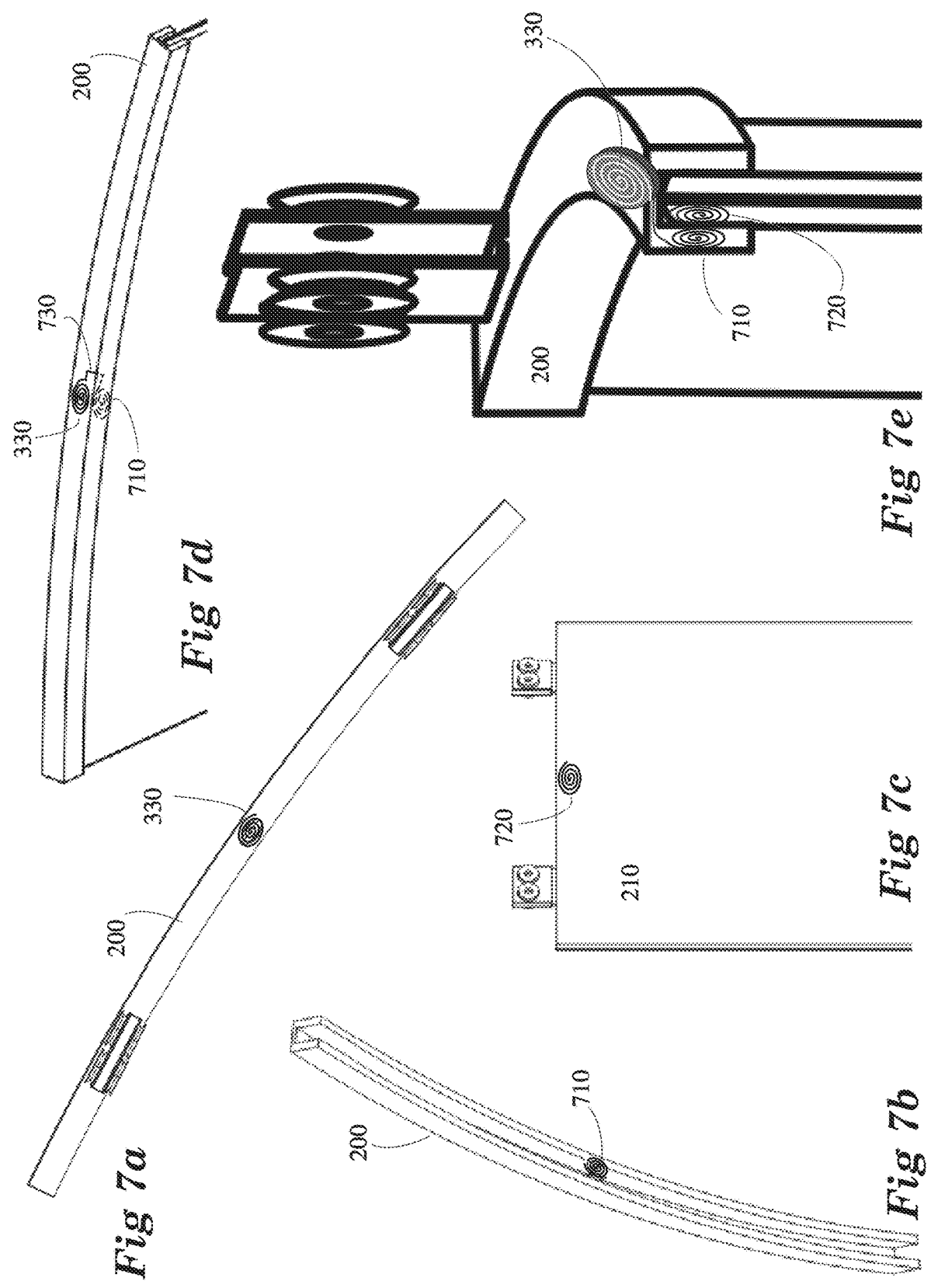
FIGS. 7a-7e show different views of the top of a movable glass door, and show the relationship of the inductive receiving and transmitting coils.

FIG. 7 illustrates several features that may be present in a sliding glass assembly. As seen in FIG. 7d, an inductive receiving coil 330, which receives 100 to 400 kHz power from building wiring 155 from a building wiring coil 460, transfers that power to a transmitting coil 710 that is attached to sliding glass frame 200. The transmitting coil 710 transmits power to receiving coil 720 that is located on a glass surface in smart glass window. As illustrated in FIG. 2 and FIG. 3, multiple windows 220 may be located within a single assembly, so the frame 200 may have at least one coil 710 for each window that is mounted to the frame.

FIG. 8 illustrates embodiments in which multiple layers of electrochromic glass are physically placed in series such that each layer would have a receive coil 136, power conditioning circuitry 112 and transmitting coils 138 similar to 460. Power would be extracted from the building wiring 155 through the transmitting coils 150 sufficient to power the multiple layers of electrochromic glass, each with their own receive and power conditioning circuits 112.

FIG. 8a illustrates that antenna 136 is placed against the glass with a ground or power plane 104b behind the coil isolating the receive coil 136 from the next transmission coil 138. Accordingly, element 104b may serve both as an electrode for electrochromic layer 105 and as a signal ground plane between coils 136 and 138 to isolate RF propagation between the coils. This can be accomplished without compromising operation of the electrochromic layer 105 by maintaining the potential of electrode 104b while varying the potential of electrode 104a to change the transmission characteristics of electrochromic layer 105.

In an embodiment, electrodes 104a and 104b are as little as a few atoms in thickness, and coils 136 and 138 may have similar thickness or thickness on the nanometer scale, while electrochromic layer 105 may also have a thickness on the nanometer scale, e.g. several tens of nanometers. Accordingly, these materials occupy minimal space within the window. Insulative materials may be selectively deposited to isolate structures as appropriate.

In the embodiments of FIGS. 8a and 8b, convertor/inverter 160 and processor 170 are disposed on electrode 104b, which can act as a ground plane for these components, instead of running a separate ground terminal to a conductive frame material, for example. The convertor/inverter 160, processor 170 and other components are electrically isolated from the electrochromic layer by, for example, an insulating material selectively deposited over those structures, by removing portions of an otherwise continuous electrochromic layer 105 around those structures, or by selectively depositing the electrochromic material so that it does not cover those structures. When electrical components are hidden by a frame, the electrochromic layer 105 and electrode 104*a* may terminate at the edge of the frame to expose the electrical components.

Power conditioning circuits 112 project power through transmit antenna 138 to the next electrochromic glass as depicted in FIG. 8*b*. In particular, the circuits 112 of a first electrochromic assembly 810 receive power from a first receiving coil 136 on an inner layer of glass, and provide power to a first transmitting coil 138, which is inductively coupled to and transmits power to a second receiving coil 136 of a second electrochromic assembly 810. This same architecture can be used to transfer power between multiple assemblies 810 in a single window 100, each of which may vary a different transmission characteristic.

FIG. 10 and FIG. 7*d* present two configurations of passive coil coupling. In FIG. 10, the two series-connected coils 130 and 136 are used to overcome the non-transmitting properties of a metallic frame. In FIG. 7*d*, two series-connected coils are used to transform a vertically oriented RF field to a horizontally oriented RF field that is compatible with the antenna coil positioned on the side of the glass.

In the embodiment of FIG. 10, power is transferred from wiring 155 through a transmitting coil 150 to receiving coil 130 which is disposed on a surface of frame 110. This configuration allows receiving coil 130 to be positioned sufficiently close to transmitting coil 150 to provide inductive coupling between the coils. Power is routed from receiving coil 130 to transmitting coil 135 by wiring 137 which runs across the frame 110, e.g. through the frame or over a surface of the frame. Transmitting coil 135, which may be a passive coil, is inductively coupled to receiving coil 136, which is disposed on glass surface 106*a*. This arrangement can overcome challenges presented by a metal frame material, and accommodate situations where it is not possible to locate wire-side coil 155 sufficiently close to receiving coil 136 to provide inductive coupling between those coils.

The invention claimed is:

1. A window comprising:
an electrochromic assembly including an electrochromic layer, a first electrode and a second electrode;
a first inductive coil coupled to the first electrode and the second electrode, the inductive coil being configured to be inductively coupled to a second inductive coil to receive AC power from the second inductive coil;
a power converter configured to convert the AC power from the first inductive coil to DC power for powering the electrochromic layer; and
a frame enclosing the electrochromic assembly,
wherein the first inductive coil includes a conductive material disposed on a surface of a first sheet of glass within the window,
wherein the electrochromic assembly is a first electrochromic assembly that includes a third inductive coil and the power converter, the power converter is coupled to the third inductive coil, and the third inductive coil is configured to transmit power to a fourth inductive coil,
wherein the window further comprises a second electrochromic assembly including the fourth inductive coil coupled to a second power converter, and a second electrochromic element, and
wherein the second electrochromic element receives power from the second power converter.

2. The window of claim 1, further comprising:
a wireless receiver antenna disposed on a surface of the first sheet of glass and being made of a transparent conductive material.

3. The window of claim 2, further comprising:
a wireless communications processor coupled to the wireless receiver antenna, wherein the wireless communications processor processes wireless communications received through the wireless receiver antenna.

4. The window of claim 3, wherein terminals of the wireless communications processor are coupled to conductive traces on the surface of the sheet of glass.

5. The window of claim 4, wherein the wireless communications processor includes a die that is bonded to the conductive traces.

6. The window of claim 3, further comprising a spacer located on a perimeter of the interior surface of the sheet of glass, wherein a thickness of the spacer is greater than a thickness of the wireless communications processor, and the spacer provides a space between the wireless communications processor and adjacent structures.

7. The window of claim 1, wherein circuitry of the power converter further comprises a window control device configured to receive control signals from the first inductive coil and control a state of the electrochromic layer based on the control signals.

8. The window of claim 1, further comprising:
a switch including first and second electrodes and at least one visible element disposed on a glass surface of the window, wherein the switch operates using the DC power provided by the power converter, and conductive lines coupling the DC power between the first and second electrodes of the switch and the power converter are transparent.

9. A window comprising:
an electrochromic assembly including an electrochromic layer, a first electrode and a second electrode;
a first inductive coil configured to be inductively coupled to a second inductive coil to receive AC power from the second inductive coil;
a power converter configured to convert the AC power from the first inductive coil to DC power for powering the electrochromic layer; and
a frame enclosing the electrochromic assembly,
wherein the first inductive coil includes a conductive material disposed on a surface of the frame,
wherein the first inductive coil is coupled to a passive transmitting coil that is configured to be inductively coupled to a first receiving coil disposed on an inner layer of the window.

10. The window of claim 9, further comprising:
a wireless receiver antenna disposed on a surface of a sheet of glass and being made of a transparent conductive material.

11. The window of claim 10, further comprising:
a wireless communications processor coupled to the wireless receiver antenna, wherein the wireless communications processor processes wireless communications received through the wireless receiver antenna.

12. The window of claim 11, wherein terminals of the wireless communications processor are coupled to conductive traces on the surface of the sheet of glass.

13. The window of claim 12, wherein the wireless communications processor includes a die that is bonded to the conductive traces.

14. The window of claim 11, further comprising a spacer located on a perimeter of the interior surface of the sheet of glass, wherein a thickness of the spacer is greater than a thickness of the wireless communications processor, and the spacer provides a space between the wireless communications processor and adjacent structures.

15. The window of claim 9, wherein circuitry of the power converter further comprises a window control device configured to receive control signals from the first inductive coil and control a state of the electrochromic layer based on the control signals.

16. The window of claim 9, wherein the electrochromic assembly includes a second receiving coil configured to be inductively coupled to the passive transmitting coil, and a second power converter configured to convert AC power from the second receiving coil to DC power.

17. The window of claim 16, wherein the electrochromic assembly further comprises a second transmitting coil electrically coupled to the second power converter and disposed on the second electrode of the electrochromic layer, wherein the second electrode is a ground plane of the second transmitting coil.

18. A window comprising:
an electrochromic assembly including an electrochromic layer, a first electrode and a second electrode;
a first inductive coil coupled to the first electrode and the second electrode, the inductive coil being configured to be inductively coupled to a second inductive coil to receive AC power from the second inductive coil;
a power converter configured to convert the AC power from the first inductive coil to DC power for powering the electrochromic layer;
a frame enclosing the electrochromic assembly;
a wireless receiver antenna disposed on a surface of the first sheet of glass and being made of a transparent conductive material; and a wireless communications processor coupled to the wireless receiver antenna, wherein the wireless communications processor processes wireless communications received through the wireless receiver antenna,
wherein terminals of the wireless communications processor are coupled to conductive traces on the surface of the sheet of glass, and
wherein the first inductive coil includes a conductive material disposed on a surface of a first sheet of glass within the window.

19. A window comprising:
an electrochromic assembly including an electrochromic layer, a first electrode and a second electrode;
a first inductive coil coupled to the first electrode and the second electrode, the inductive coil being configured to be inductively coupled to a second inductive coil to receive AC power from the second inductive coil;
a power converter configured to convert the AC power from the first inductive coil to DC power for powering the electrochromic layer;
a frame enclosing the electrochromic assembly; and
a switch including first and second electrodes and at least one visible element disposed on a glass surface of the window,
wherein the switch operates using the DC power provided by the power converter, and conductive lines coupling the DC power between the first and second electrodes of the switch and the power converter are transparent, and
wherein the first inductive coil includes a conductive material disposed on a surface of a first sheet of glass within the window.

* * * * *